May 18, 1943 K. L. BRITTON ET AL Re. 22,313

ELECTRIC RESISTOR

Original Filed July 20, 1940

Inventors:
Kenneth L. Britton,
Reginald O. Eaton,
by Harry E. Dunham
Their Attorney.

Reissued May 18, 1943

Re. 22,313

UNITED STATES PATENT OFFICE 22,313

ELECTRIC RESISTOR

Kenneth L. Britton and Reginald O. Eaton, Erie, Pa., assignors to General Electric Company, a corporation of New York Original No. 2,275,840, dated March 10, 1942, Serial No. 346,612, July 20, 1940. Application for reissue September 19, 1942, Serial No. 459,034

6 Claims. (Cl. 201—74)

This invention relates to electric resistors, more particularly to resistors of substantial physical size and carrying currents of large value such as used in the control of electric railway motors, and the like, and has for its object a simple and reliable supporting structure for the resistor providing for expansion of metallic parts independently of the electrically insulating supporting means.

Electric resistor units for control purposes have heretofore been constructed with a helical edgewise wound resistance ribbon mounted on an elongated heat refractory support with a metal supporting rod extending through a bore in the support and at each end carrying electric terminals for the resistor and being provided with means for securing it to a support for the resistor unit. Such constructions have the disadvantage that the ends of the supporting metallic rod are rigidly secured to the support for the resistor and the rod is therefore not free to expand and contract. As a result, when heated to high temperatures during the operation of the resistor, the rod with its ends secured, bends or buckles in the middle and likewise bends or buckles the resistor. This results in damage to the insulating support for the resistor and engagement of certain of the turns of the resistor whereby these turns are short circuited.

In carrying out our invention, we utilize an edgewise wound helical ribbon resistor which is mounted on a heat refractory electrically insulating support provided with a bore through which extends loosely a metal supporting rod. In spaced relation with each end of the heat refractory support is an adidtional heat refractory support provided with a bore through which also extends loosely the supporting rod. These supports at each end are arranged to be secured to the support for the resistor as a whole, the rod being free to expand and contract in response to changes in temperature independently of the heat refractory parts.

Figure 1:
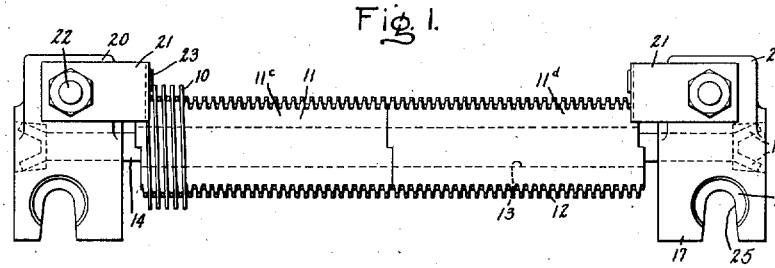
Figure 2:
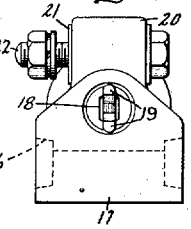
Figure 3:
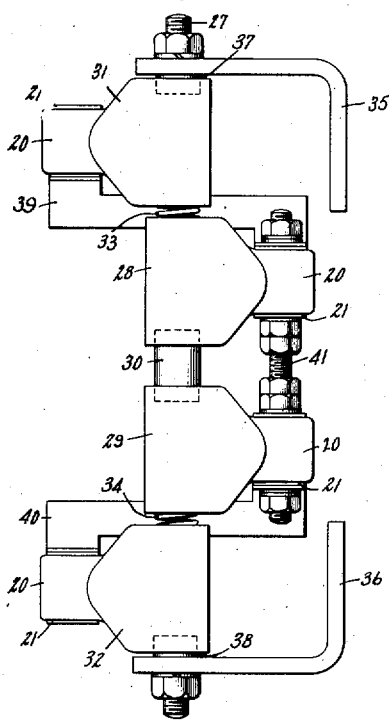
Figure 4:
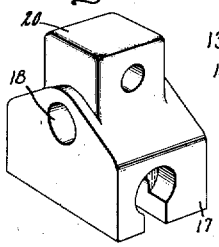
Figure 5:
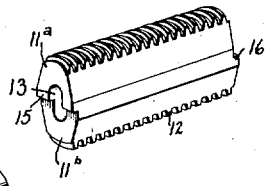

For a more complete understanding of our invention, reference should be had to the accompanying drawing, Fig. 1 of which is a side elevation view of an electric resistor embodying our invention; Fig. 2 is an end elevation view of Fig. 1; Fig. 3 is an end view of an assembly of a plurality of resistors embodying our invention; Fig. 4 is a perspective view of the insulator support; while Fig. 5 is a perspective view of the support for the resistance ribbon.

Referring to the drawing, in carrying out our invention in one form, we provide an edgewise wound helical resistance conductor 10 which is preferably made from a ribbon of heat refractory resistance material, such as an alloy containing nickel and chromium, the ribbon being suitably formed into a helical edgewise shape, as shown. This resistor is mounted on a heat refractory electrically insulating support 11 provided with a helical thread 12 in which lie the turns of the resistor and whereby the turns are spaced apart a suitable distance. Also the support 11 is provided with a central longitudinally extending bore or aperture 13 through which extends loosely a supporting rod 14 made of a suitable heat refractory metal such as metal similar to that of the resistor itself.

As shown, the heat refractory support 11 is somewhat oval in cross-section and is provided with the threads 12 at each end of this oval cross-section. In other words, it provides two ridges 11*a* and 11*b* opposite each other with respect to the center of the resistor helix and provided with threads 12. Also the aperture 13 in the support 11 has an elongated cross-section, the elongation being in the direction of the greatest cross-sectional dimension of the support and the supporting rod 14 has a similar elongated cross-sectional dimension providing for increased bending strength, it being contemplated that the resistor will be supported with the threads of the refractory support at the top and bottom and the supporting rod 14 likewise arranged with its greatest dimension extending vertically.

Also the refractory support 11 is made as shown in two sections to facilitate manufacture. Preferably the support is made by molding the material then in plastic form, and then firing or drying the material. The two sections are duplicates in construction and each extends through one-half the length of the helical resistor with the opposite ends of the combined insulating support projecting from the ends of the resistor a short distance, as shown, to provide suitable electric clearances. The two parts 11*c* and 11*d* of the support are provided at each end with the upper or lower half slightly projecting forming shoulders 15 and 16. These sections are of suitable length to facilitate the manufacture of resistors of various lengths by simply putting together into end to end relation the required number of supporting sections. As shown, the sections are latched together at the abutting ends, i. e. the projecting lower or upper half of one is opposite the projecting half of the other. In this way the projecting lower half of one section at the joint serves to support the projecting upper half of the projecting section engaging it whereby the two ends are held in latched relation.

The metal supporting rod 14 projects at each end from the insulating support 11 and has mounted on it at each end a supporting block 17 of somewhat irregular shape. Each block is provided with a bore 18 of elongated cross-section into which loosely extends the supporting rod 14 and means are provided on the end of the rod for preventing the support from slipping off. As shown, the rod is provided with a central slot forming two projections 19 on the end of the rod which are forced apart. Each bore 18 is enlarged at its outer end to accommodate the expanded projections 19 entirely within the supporting blocks 17.

On its upper side, each supporting block 17 is provided with a rectangular portion 20 which is embraced by a U-shaped metallic terminal member 21, the ends of the member being provided with apertures and secured to the support 17 by a suitable bolt 22 passing through an aperture in the support. The base U of the member 21 projects a short distance from the block 17 toward the end of the resistor and has secured to it the end of the resistor preferably by means of a welded joint 23. These two terminal members 21 thus each space the supporting block 17 from the end of the resistor and likewise space the block 17 a short distance 24 from the end of the heat refractory support 11. It will be understood that electrical connections are made with each end of the resistor by means of the bolt 22 which clamps a connecting conductor in electrically conducting relation with the U-shaped terminal member 21.

Also the support 17 constitutes the means for supporting the resistor unit as a whole at each end. To facilitate the attachment of the support 17 to the support for the resistor, the support 17 is provided with a groove or slot 25 in its side opposite the terminal member 21, this slot being provided with a circular seat 26 at each end to receive and secure spacing members separating adjacent resistors when a plurality of them are mounted together. Preferably, as shown, the groove 25 extends across one end of the aperture 18, i. e., the greatest dimension of the aperture 18 extends at right angles to the groove 25. Moreover, the groove 25 and also the bolt 22 extend at right angles with the axis of the helical resistor.

In Fig. 3 we have shown a typical assembly of four resistor units, as shown in Figs. 1 and 2. The four units are secured in side by side relation at each end by a bolt 27 extending through the grooves 25 in the four supporting blocks. The two central units 28 and 29 are spaced by a tubular spacing member 30 made of heat refractory material which fits loosely into the circular seats or recesses 26 in the adjacent supporting block 17. Similar spacing insulators may be used between each of the two outside resistor units 31 and 32 and its adjacent unit 28 and 29 or, as shown, helical springs 33 and 34 made of heat refractory material similar to the metal of the resistor may be provided. These springs have the same overall dimensions as the spacing insulator 30. They expand and contract in accordance with the expansion and contractions of the bolt 27 in response to changes in temperature and thereby secure the ends of the resistor units tightly in spaced relation.

As shown, for convenience the two central units 28 and 29 may be reversed with respect to the two outside ones, as seen in Fig. 3, that is, the resistors of these two units are on the right-hand side of the bolt 27, as seen in Fig. 3. Supporting brackets 35 and 36 are provided at each end of the bolt 27 and clamped to the assembly by the bolt 27, insulating bushings 37 and 38 being provided between each bracket and its adjacent resistor support 17, these bushings lying in the bores or recesses 26. By means of suitable electrically conducting connector straps 39 and 40, the ends of the resistors are electrically connected together, these straps extending from one U-shaped terminal member 21 to another. As shown, the ends of the two middle resistor units 28 and 29 are electrically connected together by a common bolt 41 extending through and securing the two U-shaped terminals at the ends of these units.

It will thus be observed that the supporting rod 14 is free to expand and contract with respect to the supporting block 17 at each end whereby buckling of the resistor by reason of such expansion and contraction is prevented.

While we have shown a particular embodiment of our invention, it will be understood of course that we do not wish to be limited thereto, since many modifications may be made and we therefore contemplate by the appended claims to cover any such modifications as fall within the true spirit and scope of our invention.

What we claim as new and desire to secure by Letters Patent of the United States is:

1. An electric resistor comprising a supporting metal rod, electrically insulating means loosely mounted upon said metal rod to provide for expansion and contraction of said rod independently of said insulating means, a resistance conductor mounted upon said insulating means, a supporting member made of insulating material at each end of said rod, each of said supporting members being provided with an aperture through which said rod extends loosely so as to be free to expand and contract independently of said supporting member, means on the ends of said rod for securing said supporting members against removal from said rod, and attachment means on said supporting members for securing said supporting members rigidly to a common support in a predetermined fixed spaced relation with respect to each other, said rod being free to expand and contract independently of said insulating means and said supporting members in response to changes in temperature of said rod caused by heating of said resistance conductor.

2. An electric resistor comprising a supporting metal rod, an insulating support mounted upon said rod and provided with external threads, said insulating support being mounted upon said metal rod loosely to provide for expansion and contraction of said rod independently of said support, a resistance conductor mounted upon said insulating support and having turns spaced by said threads, a supporting member made of insulating material at each end of said rod, each of said supporting members being provided with an aperture through which said rod extends loosely so as to be free to expand and contract independently of said supporting members, means on the ends of said rods for securing said supporting members against removal from said rod, an electric terminal member secured to each of said supporting members, electric connections between each of said terminal members and one end of said resistance conductor, and attachment means on said supporting members for securing said supporting members rigidly to a common support in a predetermined fixed spaced relation with respect to each other, said rod being free to expand and contract independently of said insulating support and said supporting members in response to changes in the temperature of said rod caused by heating of said resistance conductor.

3. An electric resistor comprising an elongated support made of heat refractory electrically insulating material provided with a longitudinally extending bore and with external threads, an edgewise wound resistance ribbon mounted on said support having its turns in said threads, a supporting metal rod extending through said bore loosely to provide for expansion and contraction of said rod independently of said support, a supporting member made of insulating material on each end of said rod in spaced relation with the end of said support, each of said supporting members being provided with an aperture through which said rod extends loosely so that said rod is free to expand and contract independently of said supporting members, means on the ends of said rod for securing said supporting members against removal from said rod, an electric terminal member secured to each of said supporting members, electric connections between each of said terminal members and one end of said resistance ribbon, and attachment means for said supporting means on said supporting members for securing said supporting members rigidly to a common support in a predetermined fixed spaced relation with respect to each other, said rod being free to expand and contract independently of said elongated support and said supporting members in response to changes in the temperature of said rod caused by heating of said resistance conductor.

4. An electric resistor assembly comprising a plurality of elongated supports positioned in parallel spaced relation and made of heat refractory electrically insulating material, each said support being provided with a longitudinally extending bore and with external threads, a resistance conductor mounted upon said support and having turns spaced by said threads, a supporting metal rod extending through each said bore loosely to provide for expansion and contraction of said rods independently of said supports, a grooved supporting member made of insulating material at each end of each of said rods, each of said supporting members being provided with an aperture through which the associated rod extends loosely so as to be free to expand and contract independently of said supporting members, means on the end of said rods for securing said supporting members against removal from said rods, a bolt positioned perpendicular to said rods at each end thereof and arranged to support said grooved supporting members thereby to retain said elongated supports in parallel spaced relation, resilient spacing means for said supporting members associated with said bolts, said supporting members being loosely mounted on said bolts to provide for expansion and contraction of said bolts independently of said supporting members, and means for rigidly securing said bolts to a common support in a predetermined fixed spaced relation with respect to each other.

5. An electric resistor assembly comprising a plurality of supporting metal rods positioned in parallel spaced relation, an elongated insulating support loosely mounted upon each of said rods and provided with external threads, said loose mounting providing for expansion and contraction of said rods independently of said insulating supports, a helical resistance conductor mounted upon each of said insulating supports and having turns spaced by said threads, a grooved supporting member made of insulating material at each end of each said rods, each of said supporting members being provided with an aperture through which the associated rod extends loosely so as to be free to expand and contract independently of said supporting members, means on the ends of said rods for securing said supporting members against removal from said rods, a bolt positioned perpendicular to said rods at each end thereof and arranged to support said grooved supporting members thereby to retain said supporting metal rods in parallel spaced relation, resilient spacing means for said supporting members associated with said bolts, said supporting members being loosely mounted on said bolts to provide for expansion and contraction of said bolts independently of said supporting members, and means for rigidly securing said bolts to a common support in a predetermined fixed spaced relation with respect to each other.

6. An electric resistor assembly comprising a plurality of elongated supports positioned in parallel spaced relation and made of heat refractory electrically insulating material, each of said supports being provided with a longitudinally extending bore and with external threads, a resistance conductor mounted upon each said support having turns spaced by said threads, a supporting metal rod extending through each said bore loosely to provide for expansion and contraction of said rods independently of said supports, a grooved supporting member made of electrically insulating material positioned at each end of each of said rods, each of said supporting members being provided with an aperture through which the associated rod extends loosely so as to be free to expand and contract independently of said supporting members, means on the ends of said rods for securing said supporting members against removal from said rods, an electric terminal member secured to each of said supporting members, electric connections between each of said terminal members and one end of one of said resistance conductors, a bolt positioned at each end of said rods in perpendicular relation thereto and arranged to extend through aligned grooves in said supporting members, said supporting members being arranged in pairs alternately on opposite sides of said bolts and being loosely mounted thereon to provide for expansion and contraction of said bolts independently of said supporting members, resilient means for retaining said supporting members in spaced relation with said bolts, clamping means rigidly and electrically connecting said electric terminal members of said pairs of supporting members, and means for securing said bolts to a common support in predetermined fixed parallel spaced relation with respect to each other.

KENNETH L. BRITTON.
REGINALD O. EATON.